(12) United States Patent
Pu et al.

(10) Patent No.: US 11,927,235 B2
(45) Date of Patent: Mar. 12, 2024

(54) ACTIVE CONTROL STEWART VIBRATION DAMPING PLATFORM BASED ON MAGNETIC TRANSMISSION

(71) Applicants: Chongqing University, Chongqing (CN); Shanghai University, Shanghai (CN)

(72) Inventors: Huayan Pu, Chongqing (CN); Zhi Sun, Chongqing (CN); Jun Luo, Chongqing (CN); Jinglei Zhao, Chongqing (CN); Jin Yi, Chongqing (CN); Yi Qin, Chongqing (CN); Shujin Yuan, Chongqing (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 0 days.

(21) Appl. No.: 18/135,028

(22) Filed: Apr. 14, 2023

(65) Prior Publication Data
US 2023/0332666 A1 Oct. 19, 2023

(30) Foreign Application Priority Data
Apr. 15, 2022 (CN) .......................... 202210397602.X

(51) Int. Cl.
*F16F 15/00* (2006.01)

(52) U.S. Cl.
CPC .......... *F16F 15/002* (2013.01); *F16F 15/005* (2013.01); *F16F 2228/066* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,295,224 A | * | 1/1967 | Cappel | B23Q 1/48 248/163.1 |
| 3,577,659 A | * | 5/1971 | Kail | G09B 9/14 403/77 |
| 3,592,422 A | * | 7/1971 | Paine | F16F 15/067 248/589 |
| 5,401,128 A | * | 3/1995 | Lindem | B23Q 1/5462 408/1 R |
| 5,511,979 A | * | 4/1996 | Perfect | G09B 9/14 472/130 |

(Continued)

*Primary Examiner* — Monica E Millner
(74) *Attorney, Agent, or Firm* — EVAN LAW GROUP LLC

(57) ABSTRACT

Disclosed is an active control Stewart vibration damping platform, including a load-bearing platform, a base, and six telescopic rods. Each telescopic rod includes a driving motor, a rotating shaft, a sleeve, and a moving rod. One end, away from the driving motor, of the rotating shaft is provided with a cylindrical cavity, one end of the moving rod penetrates through the cylindrical cavity, and the sleeve is sleeved outside the rotating shaft. The rotating shaft is in running fit with the sleeve through a first bearing, and the moving rod is in sliding fit with the sleeve through a second bearing. The moving rod and the rotating shaft are respectively provided with a spiral permanent magnet. The spiral permanent magnet on the rotating shaft can drive the moving rod to move in an axial direction of the rotating shaft through the spiral permanent magnet on the moving rod when rotating.

6 Claims, 2 Drawing Sheets

(56) References Cited

U.S. PATENT DOCUMENTS

| | | | | |
|---|---|---|---|---|
| 5,538,373 | A * | 7/1996 | Kirkham | B25J 17/0216 |
| | | | | 409/145 |
| 5,605,462 | A * | 2/1997 | Denne | H02K 7/00 |
| | | | | 434/45 |
| 5,947,740 | A * | 9/1999 | Kim | G09B 9/14 |
| | | | | 434/30 |
| 9,777,793 | B1 * | 10/2017 | Chen | G05B 19/402 |
| 10,137,379 | B2 * | 11/2018 | Wach | F16M 11/18 |
| 11,195,430 | B2 * | 12/2021 | Veltena | G09B 9/04 |
| 11,433,550 | B2 * | 9/2022 | Matich | G01L 5/1627 |
| 11,472,558 | B2 * | 10/2022 | Fagan | B64D 11/06395 |
| 11,692,607 | B2 * | 7/2023 | Pu | H02N 15/00 |
| | | | | 73/35.09 |
| 2016/0140862 | A1 * | 5/2016 | Van Lookeren Campagne | G09B 9/14 |
| | | | | 434/55 |
| 2018/0233060 | A1 * | 8/2018 | Warmerdam | G09B 9/12 |
| 2022/0243782 | A1 * | 8/2022 | Pu | F16F 15/04 |
| 2022/0282766 | A1 * | 9/2022 | Pu | F16F 15/08 |

* cited by examiner

ACTIVE CONTROL STEWART VIBRATION DAMPING PLATFORM BASED ON MAGNETIC TRANSMISSION

CROSS-REFERENCE TO RELATED APPLICATION

This patent application claims the benefit and priority of Chinese Patent Application No. 202210397602.X, filed with the China National Intellectual Property Administration on Apr. 15, 2022, the disclosure of which is incorporated by reference herein in its entirety as part of the present application.

TECHNICAL FIELD

The present disclosure relates to the technical field of vibration isolation equipment, and in particular to an active control Stewart vibration damping platform based on magnetic transmission.

BACKGROUND

Stewart platform was proposed by American scholars in 1965, and after years of development. Stewart platform has been widely used in engineering field. At present, the connecting rods of Stewart platform are mostly connected with positive stiffness. For those with low-frequency vibration isolation requirements, the negative stiffness is increased to reduce the vibration isolation frequency of the system. However, the working interval of these vibration isolation platforms is in the linear range of positive stiffness. When the external load exceeds the range, the existence of nonlinearity may lead to difficulties in system modeling and the risk of structural damage.

The existing Stewart platform has insufficient performance to cope with impact load. Facing the impact load, its peak load may damage the system structure, which will seriously affect the service life of the system. As the working space of the existing Stewart platform is limited, usually the working interval of the Stewart platform is the linear stiffness interval after the parameters of the Stewart platform are determined, which greatly limits the use of the Stewart platform.

SUMMARY

An objective of the present disclosure is to provide an active control Stewart vibration damping platform based on magnetic transmission, so as to solve the problems in the prior art, and broaden the working space the Stewart platform.

To achieve the objective above, the present disclosure provides the following solution:

An active control Stewart vibration damping platform based on magnetic transmission provided by the present disclosure includes a load-bearing platform, a base, and six telescopic rods. Six first spherical-hinge bases are uniformly and annularly arranged at the bottom of the load-bearing platform in pairwise, and six second spherical-hinge bases are uniformly and annularly arranged at the top of the base in pairwise. The telescopic rods, the first spherical-hinge bases and the second spherical-hinge bases are in one-to-one correspondence. One end of the telescopic rod is hinged to the first spherical-hinge base, and the other end of the telescopic rod is hinged to the second spherical-hinge base. Two first spherical-hinge bases connected to two adjacent telescopic rods are two first spherical-hinge bases arranged in pairwise, and two second spherical-hinge bases connected to two adjacent telescopic rods are two spherical-hinge bases not in pairwise.

Each telescopic rod includes a driving motor, a rotating shall, a sleeve, and a moving rod. The driving motor is used to drive the rotating shaft to rotate around an axis of the rotating shaft, one end, away from the driving motor, of the rotating shaft is provided with a cylindrical cavity, one end of the moving rod penetrates through the cylindrical cavity, and the sleeve is sleeved outside the rotating shaft. The rotating shall is in running fit with the sleeve through a first bearing, and the moving rod is in sliding lit with the sleeve through a second bearing. The second bearing is a ball spline bearing, the moving rod serves as a spline shaft of the ball spline bearing, and a spline housing of the ball spline bearing is fixedly connected to the sleeve. The moving rod and the rotating shaft are respectively provided with a spiral permanent magnet, the spiral permanent magnet on the rotating shaft can drive the moving rod to move in an axial direction of the rotating shaft through the spiral permanent magnet on the moving rod when rotating.

Preferably, the center of the circumference where the six first spherical-hinge bases are located and the center of the circumference where the six second spherical-hinge bases are located are located on the same vertical axis, and the diameter of the circumference where the six first spherical-hinge bases are located is smaller than the diameter of the circumference where the six second spherical-hinge bases are located.

Preferably, the driving motor is hinged to the corresponding second spherical-hinge base, and one end, away from the rotating shaft, of the moving rod is hinged to the corresponding first spherical-hinge base.

Preferably, the rotating shaft, the cylindrical cavity, the sleeve and the moving rod are coaxial.

Preferably, the first bearing is a deep groove ball bearing.

Preferably, the spiral permanent magnet on the rotating shaft has the same lift as the spiral permanent magnet on the moving rod.

Compared with the prior art, the present disclosure obtains the following technical effects:

The active control Stewart vibration damping platform based on magnetic transmission provided by the present disclosure has a large working space. In accordance with the active control Stewart vibration damping platform based on magnetic transmission, the rotating shaft is driven by the driving motor to rotate, and then the rotation of the rotating shaft is converted into the linear motion of the moving rod by the magnetic transmission, thus completing the pose regulation and control of the load-bearing platform. The wide-range change of the load-bearing platform can be achieved, the working space of the Stewart platform is greatly broadened, and meanwhile, after obtaining vibration parameters of the load-bearing platform, the vibration parameters can be encoded and transmitted to the driving motor, so as to complete the active control of the vibration damping platform.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
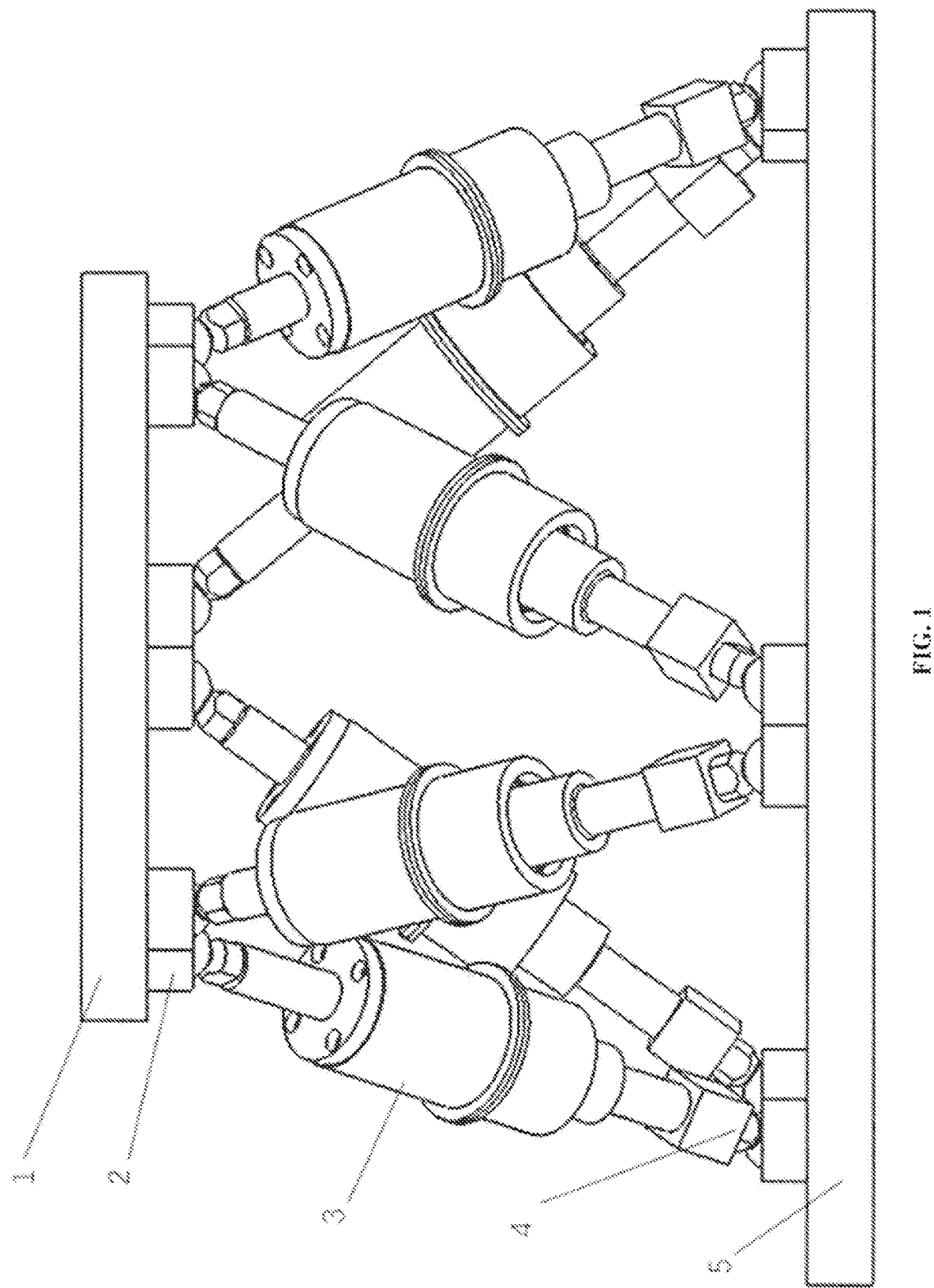
FIG. 1 is a structural schematic diagram of an active control Stewart vibration damping platform based on magnetic transmission in accordance with the present disclosure.

In the drawings: 1—load-bearing platform; 2—first spherical-hinge base; 3—telescopic rod; 4—driving motor; 5—base; 6—moving rod; 7—first bearing; 8—sleeve; 9—spiral permanent magnet; 10—rotating shaft; 11—second bearing.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an active control Stewart vibration damping platform based on magnetic transmission, so as to solve the problems in the prior art, and broaden the working space of the Stewart platform.

To make the objectives, features and advantages of the present disclosure more apparently and understandably, the following further describes the present disclosure in detail with reference to the accompanying drawings and the specific embodiments.

Figure 2:
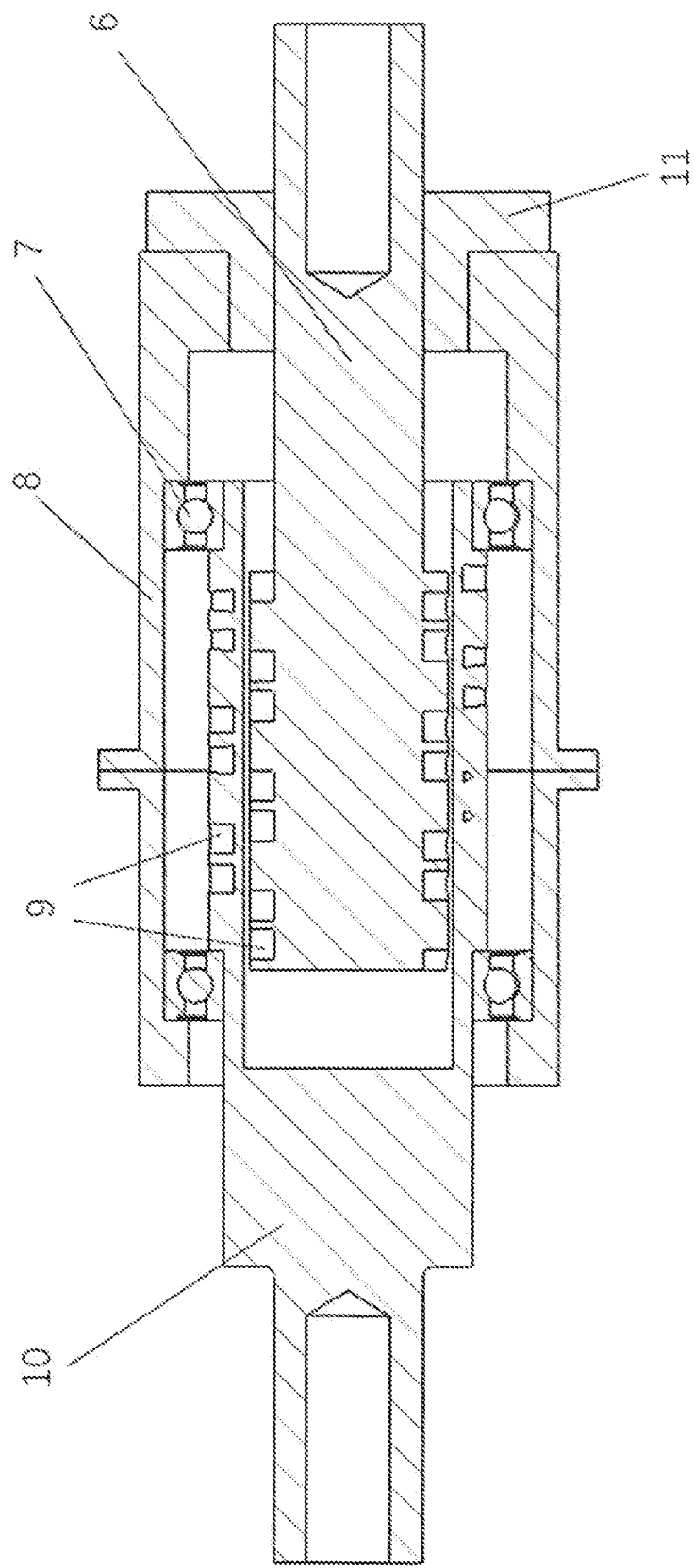
FIG. 2 is a structural schematic diagram of a telescopic rod in an active control Stewart vibration damping platform based on magnetic transmission in accordance with the present disclosure.

As shown from FIG. 1 to FIG. 2, it is provided an active control Stewart vibration damping platform based on magnetic transmission according to an embodiment, which includes a load-bearing platform 1, a base 5, and six telescopic rods 3. Six first spherical-hinge bases 2 are uniformly and annularly arranged at the bottom of the load-bearing platform 1 in pairwise, and six second spherical-hinge bases are uniformly and annularly arranged at the top of the base 5 in pairwise. The telescopic rods 3, the first spherical-hinge bases 2 and the second spherical-hinge bases arc in one-to-one correspondence. One end of the telescopic rod 3 is hinged to the first spherical-hinge base 2, and the other end of the telescopic rod 3 is hinged to the second spherical-hinge base. Two first spherical-hinge bases 2 connected to two adjacent telescopic rods 3 are two first spherical-hinge bases 2 arranged in pairwise, and two second spherical-hinge bases connected to two adjacent telescopic rods 3 are two spherical-hinge bases not in pairwise.

Each telescopic rod 3 includes a driving motor 4, a rotating shaft 10, a sleeve 8, and a moving rod 6. The driving motor 4 is used to drive the rotating shaft 10 to rotate around an axis of the rotating shaft 10, one end, away from the driving motor 4, of the rotating shaft 10 is provided with a cylindrical cavity, one end of the moving rod 6 penetrates through the cylindrical cavity, and the sleeve 8 is sleeved outside the rotating shaft 10. The rotating shaft 10 is in running fit with the sleeve 8 through a first bearing 7, the moving rod 6 is in sliding fit with the sleeve 8 through a second bearing 11. The rotating shalt 10, the cylindrical cavity, the sleeve 8 and the moving rod 6 are coaxial.

The moving rod 6 and the rotating shaft 10 are respectively provided with a spiral permanent magnet 9. The spiral permanent magnet 9 on the rotating shaft 10 can drive the moving rod 6 to move in an axial direction the rotating shaft 10 through the spiral permanent magnet 9 on the moving rod 6 when rotating. Specifically, the spiral permanent magnet 9 on the rotating shaft 10 is called an outer-ring spiral permanent magnet, the spiral permanent magnet 9 on the moving rod 6 is called an inner-ring spiral permanent magnet. The outer-ring spiral permanent magnet can form a dislocation difference with the inner-ring spiral permanent magnet when rotating. The dislocation difference may enable the formation of an interaction force between the inner-ring spiral permanent magnet and the outer-ring spiral permanent magnet. As the inner-ring spiral permanent magnet and the outer-ring spiral permanent magnet are both spiral, the interaction force above has a component force along a circumferential direction of the moving rod 6 and a component force along the axial direction of the moving rod 6. However, as the moving rod 6 is in linear sliding lit with the sleeve 8 through a ball spline bearing, the moving rod 6 is circumferentially limited by the ball spline bearing, the component force along the circumferential direction of the moving rod 6 cannot drive the moving rod 6 to rotate in the circumferential direction, while the component force along the axial direction of the moving rod 6 can drive the moving rod 6 to move in the axial direction until the above dislocation difference and the interaction force are eliminated, thereby achieving the conversion from rotation to linear motion. The driving motor 4 is hinged to the corresponding second spherical-hinge base, and one end, away from the rotating shall 10, of the moving rod 6 is hinged to the corresponding first spherical-hinge base 2.

The center of the circumference where the six first spherical-hinge bases 2 are located and the center of the circumference where the six second spherical-hinge bases are located are located on the same vertical axis, and the diameter of the circumference where the six first spherical-hinge bases 2 are located is smaller than the diameter of the circumference where the six second spherical-hinge bases are located. Two first bearings 7 are provided, and the two first bearings are deep groove ball bearings. The second bearing 11 is a ball spline bearing, and the moving rod 6 serves as a spline shaft of the ball spline bearing. A spline housing of the ball spline bearing is fixedly connected to the sleeve 8. The spiral permanent magnet 9 on the rotating shaft 10 has the same lift as the spiral permanent magnet 9 on the moving rod 6.

The active control Stewart vibration damping platform based on magnetic transmission in this embodiment has multi-stable characteristics. After a required working position is determined, the driving motor 4 is locked to enable each telescopic rod 3 to have a positive stiffness, the platform is a Stewart vibration damping system with passive vibration isolation within a linear range. When an external load is greater than a peak load, each rod is manifested as a multi-stable system, and the number of steady-state intervals is determined by the number of turns of the spiral permanent magnet.

By introducing a non-contact magnetic transmission linear-rotation mechanism, the active control Stewart vibration damping platform based on magnetic transmission can adjust the telescopic rods 3 to achieve a wide-range telescopic motion of the system, making the system adapt to different working spaces, which greatly expands the application scenario of the Stewart platform. An output shaft of the driving motor 4 is directly connected to the rotating shaft 10, and a relationship between the rotational speed of the rotating shaft 10 and the linear motion of the moving rod 6 is as follows:

$$v = \frac{\omega \tau}{2\pi}$$

in which $\tau$ is the lift of the spiral permanent magnet, $v$ is the linear motion speed of the moving rod 6, and $\omega$ is the rotational angular velocity of the rotating shaft 10.

As the load transfer between the rotating shaft 10 and the moving rod 6 is in a non-contact way, when the system encounters an impact load, the peak value is able to exceed the bearing capacity of the system, which may cause structural damage to ordinary Stewart. However, in this embodiment, due to the existence of the two spiral permanent magnets 9 on the rotating shaft 10 and the moving rod 6, the telescopic rods 3 can enter a new steady-state region, that is, the whole platform can enter a new steady-state region, and the driving motor 4 of the rotating shaft 10 can adjust a connecting rod to the previous steady-state region in the form of rotation when a steady-state jump occurs, thus effectively avoiding the damage of the system.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An active control Stewart vibration damping platform based on magnetic transmission, comprising a load-bearing platform, a base, and six telescopic rods, wherein six first spherical-hinge bases are uniformly and annularly arranged at a bottom of the load-bearing platform in pairwise, six second spherical-hinge bases are uniformly and annularly arranged at a top of the base in pairwise; the telescopic rods, the first spherical-hinge bases and the second spherical-hinge bases are in one-to-one correspondence; one end of each telescopic rod is hinged to a corresponding one of the first spherical-hinge bases, and another end of each telescopic rod is hinged to a corresponding one of the second spherical-hinge bases; two first spherical-hinge bases connected to two adjacent telescopic rods are two first spherical-hinge bases arranged in pairwise, and two second spherical-hinge bases connected to the two adjacent telescopic rods are adjacent to each other and are two second spherical-hinge bases in different pairs;

each telescopic rod comprises a driving motor, a rotating shaft, a sleeve, and a moving rod; the driving motor is used to drive the rotating shaft to rotate around an axis of the rotating shaft, one end, away from the driving motor, of the rotating shaft is provided with a cylindrical cavity, one end of the moving rod penetrates through the cylindrical cavity, and the sleeve is sleeved outside the rotating shaft; the rotating shaft is in running fit with the sleeve through a first bearing, the moving rod is in sliding fit with the sleeve through a second bearing, the second bearing is a ball spline bearing, the moving rod serves as a spline shaft of the ball spline bearing, and a spline housing of the ball spline bearing is fixedly connected to the sleeve; the moving rod and the rotating shaft are respectively provided with a spiral permanent magnet, the spiral permanent magnet on the rotating shaft is configured to drive the moving rod to move in an axial direction of the rotating shaft through the spiral permanent magnet on the moving rod when rotating.

2. The active control Stewart vibration damping platform based on magnetic transmission according to claim 1, wherein the center of the circumference where the six first spherical-hinge bases are located and, the center of the circumference where the six second spherical-hinge bases are located are located on the same vertical axis, and the diameter of the circumference where the six first spherical-hinge bases are located is smaller than the diameter of the circumference where the six second spherical-hinge bases are located.

3. The active control Stewart vibration damping platform based on magnetic transmission according to claim 1, wherein the driving motor is hinged to a corresponding one of the second spherical-hinge bases, and another end, away from the rotating shaft, of the moving rod is hinged to a corresponding one of the first spherical-hinge bases.

4. The active control Stewart vibration damping platform based on magnetic transmission according to claim 1, wherein the rotating shaft, the cylindrical cavity, the sleeve and the moving rod are coaxial.

5. The active control Stewart vibration damping platform based on magnetic transmission according to claim 1, wherein the first bearing is a deep groove ball bearing.

6. The active control Stewart vibration damping platform based on magnetic transmission according to claim 1, wherein the spiral permanent magnet on the rotating shaft has the same lift as the spiral permanent magnet on the moving rod.

* * * * *